March 4, 1952     P. C. TALMADGE ET AL     2,587,789
MOTOR OVERLOAD PROTECTOR TERMINAL STRUCTURE
Filed Oct. 26, 1949
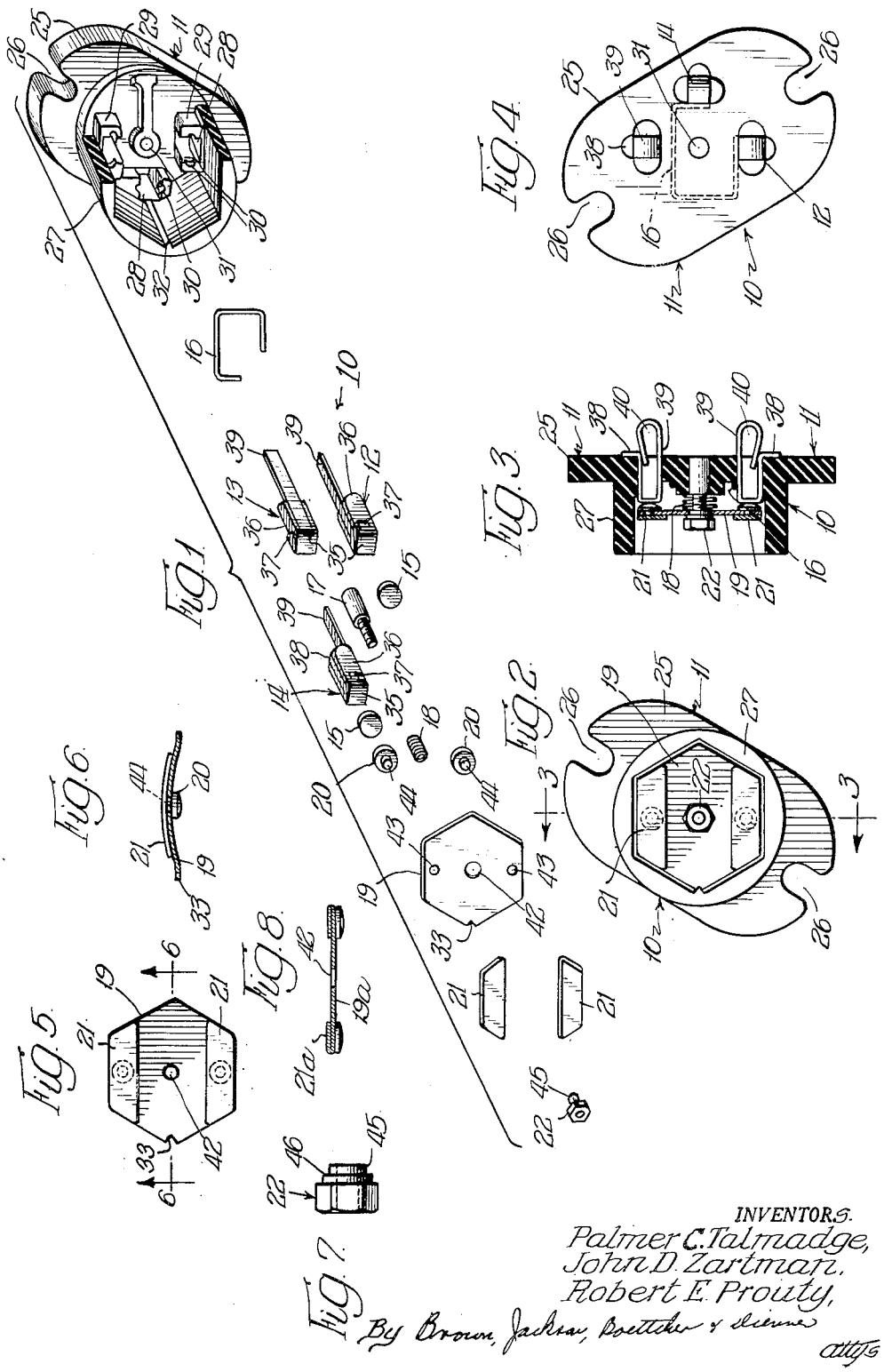
INVENTORS.
Palmer C. Talmadge,
John D. Zartman,
Robert E. Prouty,
By Brown, Jackson, Boettcher & Dienner
Attys Patented Mar. 4, 1952

2,587,789

UNITED STATES PATENT OFFICE 2,587,789

MOTOR OVERLOAD PROTECTOR TERMINAL STRUCTURE

Palmer C. Talmadge and John D. Zartman, Logansport, and Robert E. Prouty, Cass County, Ind., assignors to Essex Wire Corporation, Logansport, Ind., a corporation of Michigan Application October 26, 1949, Serial No. 123,775

2 Claims. (Cl. 173—324)

Our invention is directed to a new and improved overload protector for protecting electric devices from damage due to overloading and overheating of the windings.

More particularly, our invention is concerned with an automatic resetting device utilizing a bimetallic actuator for protecting the windings of electric motors, or like electrical circuits, from excessive currents and temperatures.

It is a well recognized principle among those familiar with the operation of electric devices, such as motors, that permanent and serious damage may be caused by the presence of excessive temperatures and currents in the windings. Among various devices employed to guard against these damaging conditions, control circuits and numerous thermally responsive devices have been utilized, including bimetallic switches of various designs. However, the difficulty of maintaining proper calibration of the bimetal element to provide a uniform and proper "snap" in the switching action has proven a serious detriment in the past.

It is a primary object of this invention to provide a new, improved and simplified overload protective device capable of automatically resetting itself to protect the windings of a motor from excessive currents and temperatures.

It is one of the objects of this invention to provide a new and improved construction of a bimetallic actuator for an overload protector capable of maintaining its calibrated radius of curvature during repeated switching action.

It is another object of this invention to provide a new and simplified manner of adjusting the opening temperature of the bimetal switch of the overload protector unit.

It is a further object of this invention to provide a new and improved bimetallic overload protective device adapted to substantially eliminate contact flutter and intermittent circuit operation of the switching element thereof.

It is a further object of this invention to provide an overload protector having a simple and new terminal connector which will prevent solder from flooding the interior of the protective unit when connecting it to the motor leads or in circuit with other types of electrical devices.

These and other objects will appear from the following detailed description.

Now, in order to acquaint those skilled in the art with the manner of constructing and utilizing a device in accordance with the principle of our invention, a description of a preferred embodiment thereof shall be made with reference to the accompanying drawings wherein:

Figure 1 is an exploded projection drawing showing the relationship and arrangement of the various parts of an overload protective unit embodying our invention;

Figure 2 is a plan view of the assembled unit;

Figure 3 is a cross-sectional view taken along line 3—3 of Figure 2;

Figure 4 is a bottom view of the unit shown in Figure 2;

Figure 5 is an enlarged detailed plan view of the bimetallic switch blade assembly;

Figure 6 is a detailed cross-sectional view taken along the line 6—6 of Figure 5;

Figure 7 is a detailed side elevation of the adjusting nut used to regulate the opening temperature of the protector; and Figure 8 is a detailed sectional view similar to Figure 5 taken through the reinforced edges of an alternate type of blade assembly.

This invention may be best understood with reference to the exploded projection of Figure 1 which shows a protector unit 10 comprising a base 11 in which may be assembled three post terminals 12, 13 and 14, a pair of cylindrical contact points 15, a heater element 16, a centrally disposed adjusting post 17, a tensioning coil spring 18, an operating bimetal blade 19, a pair of contact buttons 20, 20, a pair of segmental curvature reinforcing plates 21, 21, and an adjusting nut 22.

The base may be of any suitable insulating material, such as "Bakelite," and may be of any convenient compact shape or size, depending on the requirements of use. As shown in Figures 1, 2, 3 and 4, the base has a substantially oval shaped foundation plate 25 fitted with suitable fastening slots 26, 26 for mounting the unit to a stationary mounting, such as a motor frame or shell, by means of screws or similar fasteners. A centrally disposed cylindrical cup 27 may be formed integrally with the foundation plate to extend outwardly from the top surface thereof to form a suitable receptacle or housing for receiving and protecting the various parts of the assembled unit. As shown herein, the interior profile of the cup 27 is hexagonal in shape for convenience, but may be of other desired polygonal shape, or circular. Three square apertures 28 may be formed in the foundation plate for receiving one end of the terminals 12, 13 and 14 in assembly. Three reinforcing projections 29 may be formed as part of the cup and foundation plate to lie within the interior periphery of the cup in surrounding relation to the square apertures 28 for providing lateral strength and rigidity to the terminals and for positively locating the mounted terminals, as by means of female guide slot 30 formed therein. A centrally disposed circular hole 31 may be provided in the foundation plate 25 to receive a knurled end of the adjusting post 17, adapted to be press fitted therein. If desired, a guiding bead 32 may be provided, preferably at one of the apexual corners of the cup's interior, to provide positive locating means for the assembled bimetal blade 19, as will appear more clearly hereinafter.

The post terminals 12, 13 and 14 may be of any suitable conducting metal, and, as shown herein in Figure 1, each comprises a top surface 35, side lugs 36, 36 with male locking projections 37 extending therefrom, a back lug 38 and an elongated front lug 39. All the lugs may be rectangular in shape and folded at right angles to the top surface of the terminal to form an open cornered box effect. As seen in Figures 3 and 4, the four lugs project through the foundation plate with the side and back lugs being turned over to meet the bottom surface of the foundation plate in assembly, while the front lug is looped back toward itself and forced inside the back lug to form a solder terminal 40 for receiving a circuit connector (not shown). It should be noted that when the three terminals are thusly mounted in the foundation plate with their head ends approximately encased by the reinforcing projections 29 in the bottom of the cup 27, a terminal assembly is provided which will prevent solder from flooding the interior of the protective unit when connecting the motor leads or circuit connectors to the solder terminals projecting from the bottom surface of the foundation plate.

The cylindrical contact points 15 are adapted to be fastened to the top surface of two of the terminals 12 and 13, as by welding or brazing, and are preferably made of silver to insure good electrical contact with the contact buttons 20. Having been so fitted with the contacts 15, as described above, the two terminals 12 and 13 will extend further up into the cup interior in assembly than the third terminal 14 to thereby contact the buttons 20 mounted to the underside of the bimetal blade 19 or 19a when the blade is in closed position in the cup.

The heater element 16 is herein shown as comprising a wire of a suitable material, such as Nichrome steel, responsive to heating by current flow of electricity and bent to any desired shape, although herein again for convenience, a substantially rectangularly bent form open at one corner is preferred. In assembly, the wire heater is fastened, as by welding or soldering, to the terminal 14 and to either one of the two capped terminals 12 or 13, to lie near the bottom of the cup 27, as shown in Figures 3 and 4.

The adjusting post 17 may be a cylindrical rod, as shown herein, threaded on one end and knurled on the remainder of its cylindrical surface. In assembly, the knurled end of the post is pressed into the circular hole 31 disposed centrally in the bottom of the base cup 27 to extend through the foundation plate. The receiving hole 31 in foundation plate 25 is desirably of smaller diameter than the diameter of the knurled portion of the adjusting post.

The tension coil spring 18 is adapted to surround the threaded end of the adjusting post, mounted in the base, as described above, so as to provide a resilient pressure against the bottom surface of the bimetal blade 19 in final assembly, for holding the bimetal blade snugly against the bottom of the adjusting nut to thus prevent the loss of any contact gap between blade and terminals 12 and 13 when the blade is in open circuit position.

The bimetal blade 19 is the operating element of the protector unit and is shown herein in Figures 5 and 6 as a hexagonal bimetallic disc composed of two layers of metal having unlike coefficients of thermal expansion, as is well known to those skilled in the art. One corner of the hexagon disc, if desired, may be provided with a notched corner 33 to receive loosely the optional guide bead 32 of the base cup 27 for positively locating the bimetal blade in its proper assembled position on the adjusting post. A cylindrical hole 42 is provided at the center of the blade for receiving the threaded end of the adjusting post and the inner end of the adjusting nut therethrough. Suitable openings 43, 43, herein shown as single, circular apertures, may be provided along two opposite margins of the hexagonal blade for receiving the upper ends of the contact buttons 20 therethrough.

The contact buttons 20 are herein shown as short, metal cylinders, and may have a nickel-plated steel backing and a silver contact surface to insure good electrical contact and rigidity. The hard, metal backing of the contact buttons is herein provided with a small cylindrical boss 44 projecting therefrom, adapted to be inserted through one of the holes 43 in the bimetal blade 19 for connection with one of the curvature reinforcing plates 21, as will appear hereinafter.

The curvature reinforcing plates 21, as shown herein, may be trapezoidal in shape to conform to the contour of the bimetal blade 19 to which they are fitted. Before final assembly, the plates 21 are welded to the contact button boss projections 44 which extend upwardly from the bottom surface of the blade through the receiving holes 43 placed in the blade margin for that purpose. Both the blade 19 and plates 21 are flat until after the plates and button contacts are welded together to grip the blade margin firmly therebetween.

Thus, united as a unit or sub-assembly, the blade 19 and attached segmental curvature plates may be formed on a cylinder of predetermined radius to bend the sub-assembly into a curved cylindrical segment, as shown in Figure 6, and thus obtain the desired operating characteristics for the bimetal blade dictated by the radius, as will appear more fully hereinafter under the operational description. The segmental plates 21 may be either of bimetal like the blade 19 or of some other metallic composition, such as nickel silver capable of current conduction and fusion with the contact buttons 20, but of sufficient thickness and rigidity to maintain their radius of curvature against aging and creepage of the metallic composition thereof. If the alternate type of blade assembly 19a, as shown in Figure 8, is employed, the individual reinforcing plates 21 are replaced by bending two opposite edges of the blade 19a back onto the main blade portion itself to produce reinforcing edges 21a; the blade and reinforcing edges then being formed to a desired curvature, as with blade 19. Thus, it should be noted that by the simple expedient of using reinforcing curvature plates or reinforced edges of sufficient strength and thickness to resist creepage and aging, the calibrated radius of curvature formed in the blade is permanently assured, and the actuating element or blade itself will not be allowed to flatten out, due to metal aging and creepage, to thereby lose its calibrated radius. If both the plates 21 and blade 19 are of bimetal, the operational characteristics of the bimetal unit will change, depending on the acting sense of the radius of curvature of the bimetal plate, as will be explained hereinafter under use and operation.

The adjusting nut 22, as shown in detail in Figure 7, may have a hexagonal head and is adapted to thread onto the threaded end of the adjusting post 17 to adjust the compression of the spring 18 and to hold the blade in its final assembled position on the adjusting post. It should be noted that the bottom portion of the nut is provided with a cylindrical bottom end 45 adapted to fit through the central circular hole 42 in the bimetal blade, and of slightly smaller diameter than the inside diameter of the tension spring 18, so that it may conveniently fit inside the upper end of the spring to maintain it in a properly centered position around the adjusting post 17. An additional cylindrical portion 46 of larger diameter than the bottom end 45 is provided to present a shoulder to the top surface of the blade 19 or 19a to press thereagainst as the nut is threaded downwardly on the post to compress the spring 18.

Use, adjustment and operation

Having thus described the various individual parts of the protector unit, it will be seen that a simple and compact protector has been provided which is thermally responsive to excessive current or temperatures in the windings of an electrical circuit or device. In its usual application, a unit such as this would be preferably mounted inside or outside the housing of the electrical device, to be protected in such a manner that the bimetallic actuating blade would operate in an ambient temperature proportional to the temperature of the windings of the electrical device or motor. The device could also be used as a thermostatic control in an electrical wiring circuit or the like. For convenience, its use with an electrical motor shall be described. Usually the blade and heater will be connected in series with the motor windings, using two of the three terminals of the unit. If a dual voltage motor be employed, then all three terminals are used. Since the bimetallic element automatically resets itself, it will continue to open circuit so long as abnormal conditions continue, that is, if there is excessive current flow, or the winding temperature is abnormally high, or if both conditions exist simultaneously.

A device of this type usually has three operating characteristics of importance; the first being the temperature at which the unit will open the circuit to be protected, the second being the temperature at which the unit will close the circuit, and the third being the operating time characteristics of the unit at a given temperature. All three of these characteristics of the protector are regulatory in the unit and their values largely specified by three external factors.

The opening temperature is generally determined by the relative positions of the protector unit and the actuating "hot spot" of the motor windings, the relative distance between the two giving rise to a temperature gradient. The temperature differential of the protector, or difference between opening and closing temperature, is largely dependent on the thermal characteristics of the motor, which keeps the cycling rate of the protector from becoming excessive, which would cause undue heating of the heater element. The required time characteristics of the protector at room temperatures are largely dictated by the maximum allowable time it takes for the motor winding temperature to become excessive when current is passed through the motor in locked position.

Adjustment of the protector's opening temperature is accomplished in final assembly by tightening or loosening the adjusting nut 22 on the adjusting post 17. Briefly, for a given radius of blade curvature, an increase in the center restraint on the blade will decrease the opening temperature, and, conversely. The protector closing temperature is fixed by the blade assembly and is not adjustable after the protector unit is complete. All other conditions being constant, shorting of the radius of curvature of the blade assembly will increase the closing temperature, and conversely. The time current characteristic of the protector unit may be varied by changing the resistance of the heater element 16 which is connected in series electrically with the blade through terminals 12 and 14 and the contacting buttons 20 resting on terminals 12 and 13 when the blade is in a closed circuit position.

It should be noted that, by mounting the blade assembly in the cup by means of an adjusting nut and spring, substantially all contact flutter and intermittent circuit operation is eliminated. Most disc type bimetallic thermostatic units of this type presently employed are provided with a loose fit between the under side of the bimetal element and a lower restraining shoulder, with a snug fit between the upper surface of the bimetal element and an upper restraining shoulder. As the bimetal element heats up, the contact pressure is decreased, due to flattening of the bimetal blade. If the temperature increases through the critical range slowly, the top surface of the bimetal element draws away from the upper restraining shoulder and the blade rests on the lower shoulder. When this occurs, the contact pressure of the blade on the contacts is practically zero and intermittent contact and flutter of the blade takes place. The nut and spring means used in this invention avoid these undesirous results by providing a snug fit on both sides of the bimetallic element.

In forming the bimetallic element in the shape of a segment of a cylindrical surface with the high, expansive side of the bimetal on the inside of the blade radius, as shown herein, certain mechanical stresses are set up in the blade by the forming or bending operations which are opposed by other thermal stresses when heat is applied to the blade. When the heat is sufficiently intense, so that the thermal stresses exceed the mechanical forming stresses in the bent blade, the blade assembly snaps open. Conversely, when the blade is again cooled, the mechanical stresses exceed the now inactive thermal stresses and the blade snaps shut to a closed position, so that the contact buttons 20 rest in contact with the two capped terminals 12 and 13.

As previously noted, the reinforcing curvature plates 21 may be made of bimetal. If such a construction be employed, and the radius of curvature lengthens as the ambient temperature increases, the protector will require less current to operate at higher temperatures. Such a protector would be particularly useful if it were desired to have the operating current inversely proportional to the ambient temperatures. Conversely, if bimetal blades and plates were assembled, or a blade such as 19a used, so that the radius of curvature of the blade shortens with an increase of ambient temperature, the protector would require greater current to operate as the temperature increases. Such a protector would then be applicable if it were desired to have the operating temperature directly proportional to the ambient temperature of the unit.

While we have herein shown and described one form in which the principles of our invention may appear, it will be readily understood that numerous changes, modifications and substitutions of equivalents may be used without departing from the spirit and scope of this invention, and, therefore, we do not wish to be limited to the specific embodiments illustrated herein, except as may appear in the following appended claims.

We claim:

1. In a thermally responsive electrical overload protector, an insulating base comprising a foundation plate and an integral cup portion projecting from said plate, a plurality of terminal receiving apertures formed in the bottom of said cup and extending through said plate, reinforcing projections formed in the bottom of said cup and surrounding each of said terminal receiving apertures, a plurality of current conducting terminal connectors insertably mounted through said reinforcing projections and apertures, three rectangular locking lugs forming three sides of each of said terminal connectors, each turned over at one end to grip the back surface of said foundation plate, a fourth rectangular lug forming the fourth side of each of said terminals, said fourth lug being longer than said three locking lugs and having its extra length reentrantly looped over outwardly of said foundation plate thereby to provide a solder terminal for receiving circuit connecting leads, and a top wall interconnecting said four lugs of each of said terminal connectors at their upper ends and closing over said apertures through said plate when said terminals are mounted therein.

2. In a thermally responsive electrical overload protector, an insulating base comprising a planar foundation plate and an integral open top cup portion positioned centrally of said plate and projecting transversely outward therefrom, said plate having a plurality of spaced terminal receiving apertures formed therethrough and communicating with said cup's interior, a hollow four sided circuit connective terminal member mounted in each of said apertures, each of said connective members comprising four spaced rectangular metal lugs interconnected at their upper ends only by a transversely related upper end wall, the lower ends of all four of said lugs extending through said base plate and projecting outwardly therefrom, male locking projections formed adjacent the upper end of two of said lugs, reinforcing projection means extending integrally outward of said base plate and cup's interior sidewall and positioned adjacent two opposite sides of each of said apertures, said reinforcing projections each having a female guide and locking slot formed therein for locking engagement with one of said male locking projections and limiting the insertion of said connective members through said base plate, and the lower end of said two lugs and a third lug being turned back on said base plates' lower surface for locking their associated connective member in said base plate, the fourth lug of each of said connective members being looped reentrantly over itself, outwardly of said base plate, and turned inside of said third lug to form a solder connective terminal for an electrical conductor.

PALMER C. TALMADGE.
JOHN D. ZARTMAN.
ROBERT E. PROUTY.

REFERENCES CITED

The following references are of record in the file of this patent:

UNITED STATES PATENTS

| Number | Name | Date |
|---|---|---|
| 2,215,366 | Alden | Sept. 17, 1940 |
| 2,290,172 | Eby | July 21, 1942 |
| 2,332,483 | Doty | Oct. 19, 1943 |
| 2,338,515 | Johns | Jan. 4, 1944 |
| 2,414,531 | Johns | Jan. 21, 1947 |
| 2,434,984 | Bolesky et al. | Jan. 27, 1948 |
| 2,439,338 | Fuge et al. | Apr. 6, 1948 |
| 2,465,654 | Millard | Mar. 29, 1949 |
| 2,496,145 | Bentley | Jan. 31, 1950 |

FOREIGN PATENTS

| Number | Country | Date |
|---|---|---|
| 799,400 | France | June 11, 1936 |